United States Patent
Wang et al.

(10) Patent No.: US 12,109,771 B2
(45) Date of Patent: Oct. 8, 2024

(54) MANUFACTURE OF OPTICAL DIFFUSERS COMPOSED OF REFLOWABLE MATERIALS

(71) Applicant: ams Sensors Singapore Pte. Ltd., Singapore (SG)

(72) Inventors: Ji Wang, Singapore (SG); Kam Wah Leong, Singapore (SG); QiChuan Yu, Singapore (SG); Yeu Woon Chan, Singapore (SG)

(73) Assignee: ams Sensors Singapore Pte. Ltd., Singapore (SG)

( * ) Notice: Subject to any disclaimer, the term of this patent is extended or adjusted under 35 U.S.C. 154(b) by 539 days.

(21) Appl. No.: 17/422,255

(22) PCT Filed: Feb. 20, 2020

(86) PCT No.: PCT/SG2020/050083
§ 371 (c)(1),
(2) Date: Jul. 12, 2021

(87) PCT Pub. No.: WO2020/176037
PCT Pub. Date: Sep. 3, 2020

(65) Prior Publication Data
US 2022/0088895 A1   Mar. 24, 2022

Related U.S. Application Data

(60) Provisional application No. 62/810,058, filed on Feb. 25, 2019.

(51) Int. Cl.
*B29D 11/00* (2006.01)
*G02B 1/04* (2006.01)
*G02B 5/02* (2006.01)

(52) U.S. Cl.
CPC .. *B29D 11/00798* (2013.01); *B29D 11/00307* (2013.01); *G02B 5/0268* (2013.01); *G02B 1/04* (2013.01)

(58) Field of Classification Search
None
See application file for complete search history.

(56) References Cited

U.S. PATENT DOCUMENTS

| | | |
|---|---|---|
| 2006/0013967 A1 | 1/2006 | Mikoshiba et al. |
| 2011/0006657 A1 | 1/2011 | Liu |
| (Continued) | | |

FOREIGN PATENT DOCUMENTS

| | | |
|---|---|---|
| CN | 1729410 A | 2/2006 |
| CN | 101943335 A | 1/2011 |
| (Continued) | | |

OTHER PUBLICATIONS

International Search Report and Written Opinion for Application No. PCT/SG2020/050083 dated Jun. 2, 2020 (11 pages).

(Continued)

*Primary Examiner* — Bao-Luan Q Le
*Assistant Examiner* — Danell L Owens
(74) *Attorney, Agent, or Firm* — Viering, Jentschura & Partner mbB

(57) ABSTRACT

A method of making optical diffuser elements (20) includes providing a substrate (100) composed of a polymer material and having openings (102) therein. An optical diffuser material (110) is dispensed into the openings (102), and the optical diffuser material (110) is hardened to form a sheet (200) composed of regions of the optical diffuser material (110) surrounded laterally by the polymer material. The method includes separating the sheet (200) into multiple optical diffuser elements (30) that retain their mechanical stability and optical properties when subjected to a reflow process.

12 Claims, 4 Drawing Sheets

(56) References Cited

U.S. PATENT DOCUMENTS

| | | | |
|---|---|---|---|
| 2015/0249734 A1* | 9/2015 | Rudmann | B29D 11/00307 |
| | | | 455/556.1 |
| 2016/0117543 A1 | 4/2016 | Huang | |
| 2016/0216138 A1 | 7/2016 | Rudmann et al. | |
| 2017/0194303 A1 | 7/2017 | Rudmann | |
| 2017/0235026 A1 | 8/2017 | Rudmann et al. | |
| 2017/0261693 A1* | 9/2017 | Gambino | G02B 6/13 |

FOREIGN PATENT DOCUMENTS

| | | | |
|---|---|---|---|
| CN | 105549134 A | | 5/2016 |
| JP | 2000141667 A | * | 5/2000 |

OTHER PUBLICATIONS

Chinese First Search Report issued for the parallel Chinese patent application No. 201980075161, dated Sep. 1, 2022, 2 pages (for informational purposes only).

\* cited by examiner

MANUFACTURE OF OPTICAL DIFFUSERS COMPOSED OF REFLOWABLE MATERIALS

FIELD OF THE DISCLOSURE

The present disclosure relates to optical diffusers.

BACKGROUND

Diffusers are optical elements that can be used to cause light to spread more evenly across a surface, reducing or removing high intensity bright spots. A diffuser can help make bright or harsh light softer by spreading it across a wider area. In some cases, an optical diffuser is used to absorb light into an optical sensor, such as a spectrometer or ambient light sensor.

Sensor modules that include diffusers may be incorporated into various types of consumer or other electronics products. Manufacturing processes for such products, however, sometimes involve relatively high temperatures (e.g., 270° C.). For example, surface mount technologies (SMT) used to mount a sensor module on a flex printed circuit substrate typically require such high temperatures as part of a reflow process. The high temperatures used during these processes may adversely impact the mechanical stability or optical performance of the diffuser.

SUMMARY

Thermally stable elements substantially retain their general shape and do not decompose at relatively high operating temperatures. This characteristic can be referred to as "reflowability."

The present disclosure describes a method for manufacturing multiple optical diffusers in parallel (i.e., simultaneously) where the optical diffusers are composed of reflowable materials so that the optical elements can be incorporated more easily into devices whose manufacture occurs, at least in part, at elevated temperatures (e.g., 270° C.) when the optical element is integrated into the device or during subsequent manufacturing processes.

For example, in one aspect, the present disclosure describes a method that includes providing a substrate composed of a polymer material and having openings therein. An optical diffuser material is dispensed into the openings, and the optical diffuser material is hardened to form a sheet composed of regions of the optical diffuser material surrounded laterally by the polymer material. The method includes separating the sheet into multiple optical diffuser elements that preferably retain their mechanical stability and optical properties when subjected to a reflow process.

Some implementations include one or more of the following features. For example, the substrate can be composed of a black epoxy and can be formed by a vacuum injection molding process. The optical diffuser material can be, for example, an epoxy material, and can be dispensed, for example, by jetting. In some cases, the optical diffuser material is operable to diffuse light in the visible range part of the electromagnetic spectrum.

The method also can include removing excess optical diffuser material that is present outside the openings. In some instances, the excess optical diffuser material is removed by polishing (e.g., lapping).

In some implementations, the method includes subjecting one or more of the optical diffuser elements to a reflow process (e.g., to a process at a temperature of at least 270° C.).

The present disclosure also describes an optical diffuser element including a first epoxy operable to diffuse light in the visible range part of the electromagnetic spectrum, and a black epoxy material laterally surrounding the first epoxy material. The optical diffuser element retains its mechanical stability and optical properties when subjected to a reflow process.

The techniques described here can facilitate incorporation of the diffusers into mobile phones or other electronics products without damaging the diffusers during reflow processes. Thus, the diffusers can be integrated directly into the assembly line process for such products.

Other aspects, features and advantages will be readily apparent from the following detailed description, the accompanying drawings, and the claims.

DETAILED DESCRIPTION

The present disclosure describes a method for manufacturing multiple optical diffusers in parallel (i.e., simultaneously) and composed of reflowable materials so that the optical elements can be incorporated more easily into devices whose manufacture occurs, at least in part, at elevated temperatures (e.g., 270° C.) when the optical element is integrated into the device or during subsequent manufacturing processes.

Figure 1:
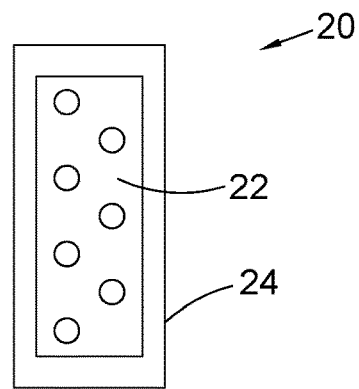
FIG. 1 illustrates an example of an optical diffuser.

As shown in FIG. 1, an optical diffuser 20 includes a first section 22 that is operable to diffuse light of a particular wavelength or range of wavelengths (e.g., in the visible range part of the electromagnetic spectrum). For example, in some instances, the first section 22 is operable to diffuse light having a wavelength in the range of 400-800 nm. The first section 22 can be surrounded laterally by a second section 24 that is substantially opaque to the particular wavelength or range of wavelengths. The first section 22 can be composed, for example, of an epoxy or other polymer material. Likewise, the second section 24 can be composed, for example, of a polymer such a black epoxy.

In general terms, the method of manufacturing the diffusers includes dispensing an epoxy material for the first section 22 of the diffusers in openings of an opaque substrate composed, for example, of black epoxy. FIGS. 2A through 6B illustrate various details of the method according to a particular implementation.

Figure 2A:
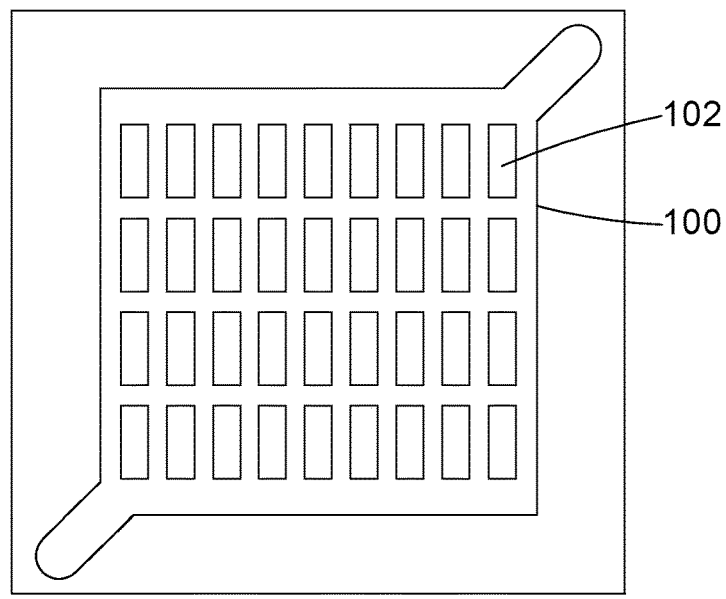
FIGS. 2A through 6B illustrate steps in an example process of manufacturing optical diffusers as shown in FIG. 1.
Figure 2B:
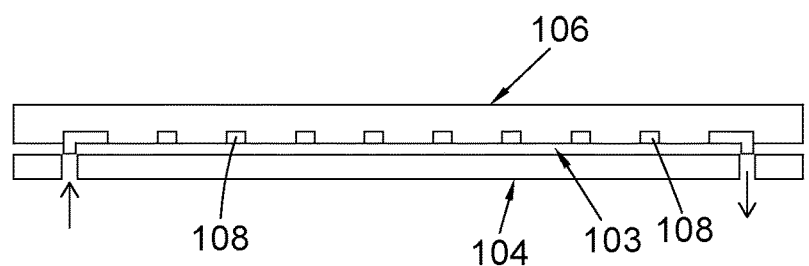

As shown in FIG. 2A, a substrate 100 composed of black epoxy and having openings (e.g., rectangular-shaped through-holes) 102 is provided. The substrate 100 can be formed, for example, by a vacuum injection molding (VIM) process, as shown in FIG. 2B. In the illustrated example, a Mylar™ foil or other support 103 is placed on a first (lower) polydimethylsiloxane (PDMS) injection tool 104. A second (upper) structured PDMS injection tool 106 is brought into close proximity with the first PDMS tool 104. The second PDMS tool 106 includes cavities into which a liquid black epoxy material 108 can be injected during the VIM process. After the black epoxy material is injected into the cavities, the black epoxy material is hardened (e.g., by thermal and or UV curing). The PDMS tools 104, 106 then are separated from one another, and the resulting black epoxy substrate 100 is removed.

Figure 3A:
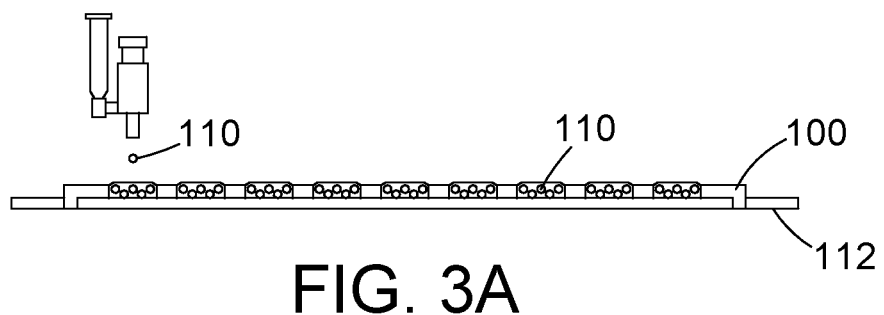
Figure 3B:
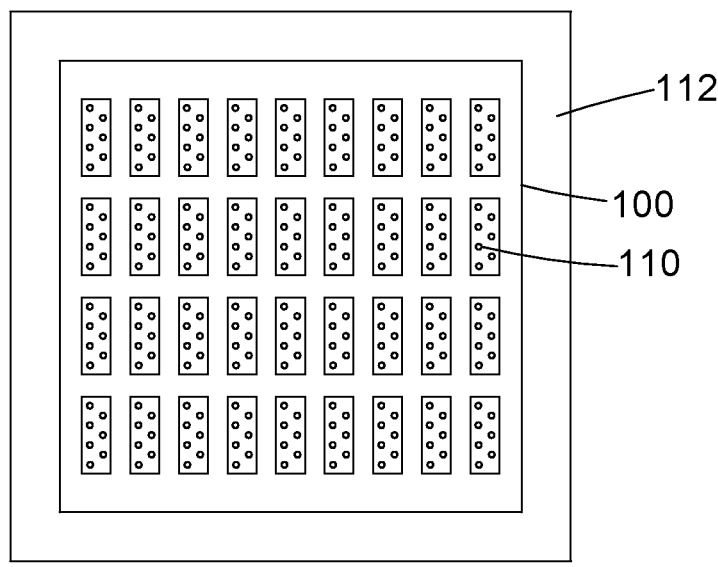

Next, as shown in FIG. 3A, a diffuser epoxy 110 is dispensed into the openings 102 of the substrate 100. In some implementations, the diffuser epoxy 110 is provided in the openings by a jetting process. The substrate 100 can be supported by a carrier 112 during the dispensing process. As illustrated in FIG. 3B, the result is the openings 102 in the black epoxy substrate 100 are filled with the diffuser epoxy material 110.

Figure 4:
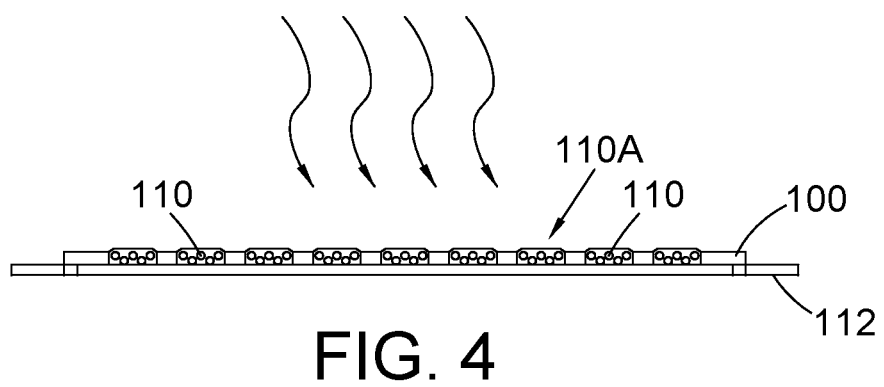

Next, as shown in FIG. 4, the diffuser epoxy 110 present in the openings of the substrate 100 is hardened, for example, by UV curing. The result is that the openings in the black epoxy substrate 100 are filled with the hardened (e.g. cured) diffuser epoxy material.

Figure 5A:
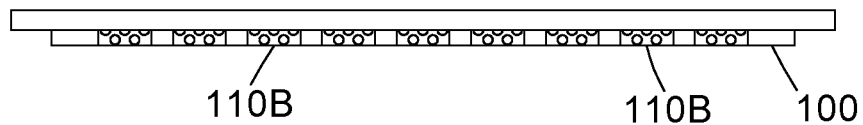
Figure 5B:
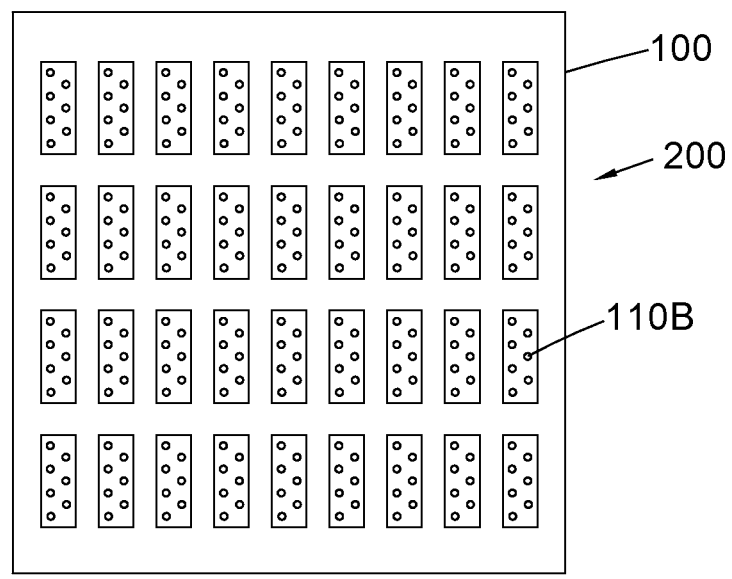

Typically, when the diffuser epoxy material 110 is dispensed into the openings of the substrate 100, there will be an excess 110A of diffuser epoxy material present outside the areas defined by the openings 102 (e.g., projecting beyond the upper surface of the substrate 100). The excess epoxy material 110A can be removed, for example, by polishing (e.g., lapping). Preferably, the excess material 110A is removed so that the surface of the remaining epoxy material 110B is substantially flush with the black epoxy substrate 100, as shown in FIG. 5A. The result, as shown in FIG. 5B, is a sheet 200 composed of the black epoxy substrate 100 in which multiple regions of cured diffuser epoxy 110B are embedded.

Figure 6A:
Figure 6B:
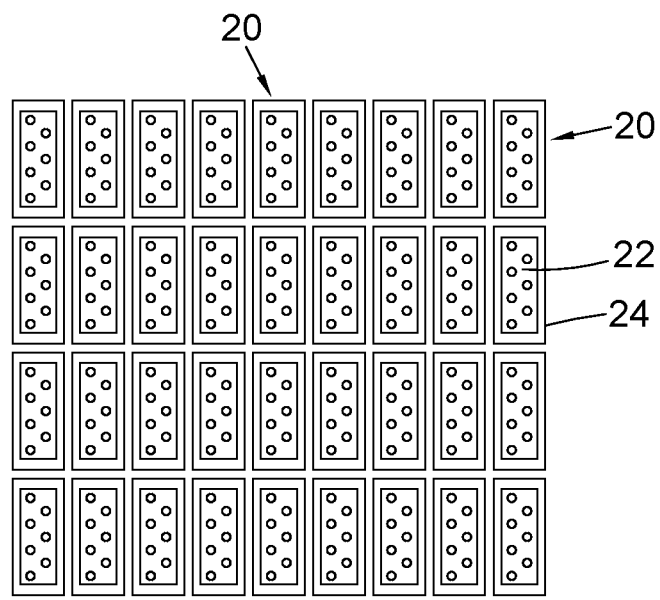

Next, as shown in FIGS. 6A and 6B, the sheet 200 is separated, for example, by dicing, into individual optical diffusers 20. The singulated diffusers 20 can be integrated into an optical module or other portable host computing device (e.g., smart phone, laptop computer, wearable device).

By using reflowable materials for the diffusers 20, the diffusers can retain their mechanical stability and optical properties even when subjected to reflow processes or other processes at elevated temperatures (e.g., 270° C. or higher).

Various modifications can be made to the foregoing description. Thus, other implementations are within the scope of the following claims.

What is claimed is:

1. A method comprising:
    providing a substrate composed of a polymer material and having openings therein;
    dispensing an reflowable optical diffuser material into the openings;
    hardening the optical diffuser material to form a sheet composed of regions of the optical diffuser material surrounded laterally by the polymer material; and
    separating the sheet into a plurality of optical diffuser elements,
    wherein the optical diffuser elements retain their mechanical stability and optical properties when subjected to reflow processes at a temperature of more than 270° C.

2. The method of claim 1 wherein the substrate is composed of a black epoxy.

3. The method of claim 2 wherein the substrate is formed by a vacuum injection molding process.

4. The method of claim 1 wherein the optical diffuser material is dispensed by jetting.

5. The method of claim 1 wherein the optical diffuser material is an epoxy material.

6. The method of claim 1 wherein the optical diffuser material is operable to diffuse light in the visible range part of the electromagnetic spectrum.

7. The method of claim 1 further including removing excess optical diffuser material that is present outside the openings.

8. The method of claim 7 wherein the excess optical diffuser material is removed by polishing.

9. The method of claim 7 wherein the excess optical diffuser material is removed by lapping.

10. The method of claim 1 including subjecting one or more of the optical diffuser elements to a reflow process.

11. The method of claim 1 including subjecting one or more of the optical diffuser elements to a process at a temperature of at least 270° C.

12. An optical diffuser element comprising:
    a first epoxy operable to diffuse light in the visible range part of the electromagnetic spectrum; and
    a black epoxy material laterally surrounding the first epoxy material,
    wherein the optical diffuser element retains its mechanical stability and optical properties when subjected to a reflow process,
    wherein the optical diffuser elements retains its mechanical stability and optical properties when subjected to a temperature of higher than 270° C.

* * * * *